United States Patent Office 3,204,008
Patented Aug. 31, 1965

3,204,008
PROCESS FOR THE PREPARATION OF AROMATIC COMPOUNDS FROM ACETYLENICALLY UNSATURATED COMPOUNDS
Walter Scheller, Munchenstein, and Gustav Daendliker, Birsfelden, Switzerland, assignors to Ciba Limited, Basel, Switzerland, a company of Switzerland
No Drawing. Filed Dec. 11, 1962, Ser. No. 243,735
Claims priority, application Switzerland, May 17, 1960, 5,622/60; Oct. 28, 1960, 12,106/60; June 19, 1962, 7,379/62
9 Claims. (Cl. 260—673)

This is a continuation-in-part of Serial Number 109,260, filed May 11, 1961.

The object of the present invention is quite generally a process for the manufacture of valuable organic compounds from acetylenically unsaturated compounds such as acetylene or acetylene derivatives or from mixtures of acetylene with acetylene derivatives. In the present process the organic compounds are manufactured with the use as catalysts of halides of tantalum or niobium.

Numerous processes are already known for the formation or manufacture of straight-chain or cyclic compounds from acetylene or acetylene derivatives. The manufacture of aromatic compounds from acetylene, in particular, is attracting increasing interest owing to the rising demand for such compounds in industry.

According to the known Berthelot process acetylene is conducted through red-hot glass tubes, whereby a minor amount of benzene and further aromatic compounds are formed together with a substantial proportion of undesirable by-products such as carbon and tar.

In the recent past, therefore, attempts have been made to cyclize acetylene at lower temperatures, primarily in the presence of suitable catalysts, for example the Reppe complex nickel compounds obtained by reacting nickel carbonyl with triphenyl phosphine. However, this cyclization process requires a superatmospheric pressure of 15 atmospheres (gauge) which makes it necessary to use special technical expedients and safety measures to exclude any risk of explosion.

There are also known cyclization reactions of acetylene derivates conducted under simpler conditions, but these methods require two component catalysts which must be inactivated on completion of the reaction. As relevant examples there may be mentioned the combination of metal hydrides or metal alkyls with metal halides, for example triisobutyl aluminium/titanium tetrachloride.

Surprisingly, it has now been found that it is possible to manufacture valuable mononuclear or polynuclear aromatic hydrocarbons from acetylene, or from acetylene derivatives containing only one or two triple bonds as polymerizable unsaturated bonds, or from mixtures of acetylene and such acetylene derivatives, with the use of unitary acting catalysts consisting substantially of halides of tantalum, or of halides or oxyhalides of niobium or of mixtures thereof. As a rule the cyclization is effected under atmospheric pressure and within a relatively low temperature range. By the present process the disadvantages connected with the aforementioned processes are overcome.

As examples of aromatic compounds that can be manufactured by the present process there may be mentioned the hexa-substituted compounds of the general formula (I) 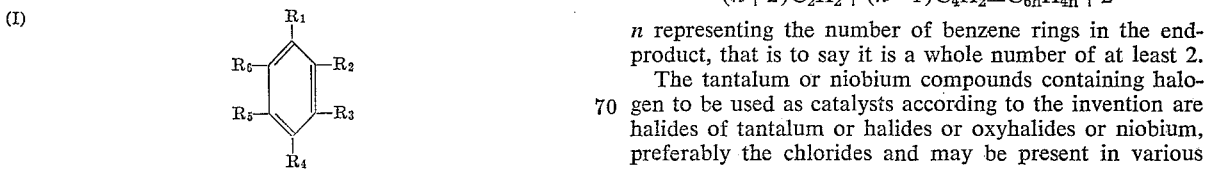

in which $R_1$ to $R_6$ each represents a hydrogen atom or a hydrocarbon radical free from polymerizable unsaturated bonds. As starting materials for the compounds of the general Formula I there are suitable, for example, compounds of the general formula (II) $\quad\quad R_7-C\equiv C-R_8$ in which $R_7$ and $R_8$ may be identical or different from each other and represent hydrocarbon radicals free from polymerizable unsaturated bonds. Thus, for example, the reaction of dimethylacetylene (2-butyn) yields hexamethylbenzene, while diethylacetylene (3-hexyn) leads to hexaethylbenzene, and 1,2-diphenylacetylene to hexaphenylbenzene.

The process of the invention is of special advantage for the manufacture of trisubstituted benzenes containing as substituents, for example, alkyl, aryl or cycloalkyl groups, from acetylene homologues of the general formula (III) $\quad\quad R_9-C\equiv C-H$ where $R_9$ represents a substituent, for example an alkyl, aryl or cycloalkyl group, each containing at most 6 carbon atoms, and more especially for the manufacture of 1:3:5-trimethylbenzene (mesitylene) or 1:2:4-trimethylbenzene (pseudo cumene) from methylacetylene (propyn), as well as for the manufacture of 1:3:5-triethylbenzene and 1:2:4-triethylbenzene from ethylacetylene (1-butyn).

The present process is also suitable for the manufacture of monosubstituted and disubstituted benzenes, using as starting material a mixture of acetylene with acetylene homologues, for example methylacetylene and ethylacetylene. It is possible, for example, to produce with the use of a mixture of acetylene and methylacetylene as starting gas, a mixture of hydrocarbons containing benzene as well as monosubstituted to trisubstituted benzenes, for example tolene, xylenes, mesitylene and pseudocumene. When a mixture of acetylene and ethylacetylene is used there is obtained, for example, a mixture of mono-, di- and tri-ethylbenzenes.

The present invention relates also to a process for the manufacture of diphenyl, triphenyls and polyphenyls wherein a mixture of acetylene and diacetylene is cyclized.

Depending on the proportion of the starting materials, acetylene and diacetylene, used, there are obtained corresponding amounts of diphenyl, triphenyls or higher polyphenyls. As a rule, 0.8 to 6, preferably 1 to 4 mols, of acetylene are used for 1 mol of diacetylene.

It is surprising to obtain diphenyl or higher diphenyls, but not condensed aromatics, according to the process of the invention. Under the influence of the described catalysts, acetylene is added on in the 1,2 or 3,4-position of the diacetylene and not in 2,3-position which would lead to condensed aromatics. The formation of diphenyl runs as follows:

$$\overset{1\ \ \ \ 2}{CH\equiv C}\quad\overset{3\ \ \ 4}{C\equiv CH}$$
$$CH\equiv CH\ \ CH\equiv CH\ \ CH\equiv CH\ \ \overline{CH\equiv CH}\longrightarrow$$

In general, diphenyl and the polyphenyl compounds are formed from acetylene and diacetylene according to the following equation $$(n+2)C_2H_2+(n-1)C_4H_2=C_{6n}H_{4n}+2$$

$n$ representing the number of benzene rings in the end-product, that is to say it is a whole number of at least 2.

The tantalum or niobium compounds containing halogen to be used as catalysts according to the invention are halides of tantalum or halides or oxyhalides or niobium, preferably the chlorides and may be present in various valency stages. Mixtures of halides of tantalum or of tantalum and niobium can likewise be used successfully, as can mixtures of oxyhalides, for example of niobium oxyhalides with niobium halides. The cyclization catalysts to be used according to the invention consist advantageously of $TaCl_3$, $TaF_5$, $NbF_5$, $NbCl_3$, $NbOBr_3$ and more especially of $TaCl_5$, $TaBr_5$, $NbCl_5$, $NbBr_5$ and $NbOCl_3$.

Of special significance is the fact that the catalysts of the invention are unitarily acting compounds, that is to say, they are used without concomitant use of reducing compounds, such as metals or metal hydrides of the first to third group of the Periodic System, complex compounds of metal hydrides with boron compounds, or the known aluminium trialkyls which form part of Ziegler catalysts.

The catalysts of the invention are not sensitive to oxygen, and after completion of the reaction they can be filtered off, dried and regenerated by treatment with halogen. Compared with the hitherto used two-component systems containing metal alkyls, the new one-component tantalum or niobium catalysts, which are non-inflammable and lend themselves to regeneration, offer considerable advantages in their application to the cyclization of acetylenically unsaturated compounds. There can also be used the adducts with neucleophilic compounds, such as halides of alkali metals or alkaline earth metals, or phosphorus chlorides or phosphorus oxychlorides respectively, or such as primary, secondary or tertiary amines, for example methylamine, dimethylamine, aniline or ammonia. Specifically, there may be mentioned as suitable catalysts for the present process the adducts of $NbCl_5$, $NbOCl_3$ and $TaCl_5$ with alkali metal halides, more especially sodium and potassium halides, the adducts of niobium pentachloride with phosphorus oxychloride or pentachloride, and the adduct of niobium pentachloride with an amine for example with tertiary butylamine.

The present invention may be performed in a variety of ways. Thus, for example, the reaction may be carried out in the gas phase using the catalyst in the solid anhydrous form, advantageously in a heatable reaction tube, while passing a constant stream of gas containing the starting material over the catalyst. Alternatively, the catalyst may be deposited on a porous support, and it may be of advantage to activate the catalyst/support system, for example by heating to a suitable temperature, before using said system for the reaction.

The catalyst as such or the catalyst/support system may also contain inert filler bodies such, for example, as granulated pumice stone or asbestos. By conventional shaping, for example, in an extrusion press, by granulating or beading, the catalyst substance may be given that grain size which is most favorable for the individual reaction apparatus used.

The flow velocity of the gas current containing the starting material, for example, acetylene, may be varied within wide limits and is advantageously determined by a preliminary trial run for the purpose of adapting it to the size of apparatus and amount of catalyst used in each case. If desired, an inert gas, for example, nitrogen, may be admixed with the gas current.

The temperature inside the reaction chamber may likewise be varied within relatively wide limits in the above-mentioned variant of the present process.

For the manufacture of benzene according to the last-mentioned variant of the present process it has been found advantageous to use a temperature within the range of 0° to 250° C. and more especially 80° to 200° C.

It is further possible to isolate the desired final product, for example benzene, from the gas current leaving the reaction chamber, for example by condensation at a suitable low temperature and to return any portion of unconsumed starting gas, for example acetylene, by a cyclic process to the catalyst. Alternatively, the whole of the gas current leaving the reaction chamber—provided it still contains residual unreacted starting gas—may be recycled into the reaction chamber for further reaction with the catalyst.

According to a further preferred variant of the present process the catalyst to be used is suspended in an inert anhydrous organic solvent and a gas current is introduced into the suspension, said gas containing the compound used as starting product in the reaction. In this case the onset of the reaction is recognized by the fact that the suspension distinctly absorbs the introduced gas. If necessary, the suspension is brought to the desired temperature before or during the introduction of the gas current. As a rule 2 to 40, preferably 10 to 30 grams of tantalum or niobium halide or niobium oxyhalide are used for every liter of solvent.

In this variant of the process the temperature within the reaction vessel may likewise be varied within relatively wide limits. Thus, for example, in the last-mentioned variant of the manufacture of benzene according to the present invention from acetylene temperatures ranging from −30° C. to +250° C. have proved very suitable, particularly good results being achieved at temperatures within the range of −30° C. to +200° C. The rate at which the gas current is introduced is advantageously chosen so that the bulk of the starting material is taken up by the solution. Alternatively, the starting material, for example acetylene, leaving the reactor in the form of unconsumed gas may be repeatedly recycled into the catalyst suspension. The amount of converted acetylenically unsaturated hydrocarbon referred to the amount of catalyst present depends on the starting material and on the reaction conditions employed. As a rule 0.5 to 50 grams of acetylenically unsaturated hydrocarbon per gram of catalyst undergo conversion.

As solvent there may be used in the aforementioned variant of the process any aliphatic, cycloaliphatic or aromatic compound. It is of special advantage to use a solvent whose boiling point differs from the boiling point of the desired final product sufficiently to enable the solvent to be separated from the final product by distillation. Thus, for example, when benzene is to be manufactured by the present process with the use of a suitable solvent having a sufficiently higher boiling point than benzene and using a temperature within the suspension between the boiling point of benzene and the higher boiling point of the solvent, the benzene formed can be distilled continuously out of the reaction vessel and then isolated by condensation or absorption. A further advantage when using an aliphatic or cycloaliphatic hydrocarbon is achieved by adding a minor amount of an aromatic hydrocarbon to it.

The present process is advantageously performed under atmospheric pressure, that is to say under a pressure of about 700 to 800 mm. Hg. Alternatively, the process may be carried out under reduced or superatmospheric pressure, e.g., under a pressure of 100 to 2000 mm. Hg.

The acetylenically unsaturated compound subjected to cyclization may be used in the gaseous or liquid form. In the latter case it is dropped portionwise or continuously into the inert solvent containing the catalyst.

According to another preferred variant of the present process the catalyst is used in the presence of a mixture which contains:

(a) At least one saturated aliphatic hydrocarbon or an alicyclic hydrocarbon such, for example, as methylcyclohexane, and (b) An aromatic hydrocarbon or an unsaturated aliphatic or alicyclic hydrocarbon, more especially a diene.

This variant is particularly advantageous when a tantalum compound, for example, tantalum pentachloride or tantalum pentabromide, is used as catalyst. The advantage gained in the case resides above all in a reduction of the time lapse between the introduction of the starting material (for example, acetylene) into the solvent and the onset of the reaction giving rise to the desired final product (for example, benzene); at a moderately raised temperature the reaction sets in in most cases immediately when the introduction of the starting material is begun. Furthermore, in the aforementioned advantageous variant of the process it is possible to achieve almost complete absorption of acetylene in the solvent and a particularly good yield of the desired final product is obtained. Among compounds of component (b) which thus contribute towards the activation of the catalysts, more especially the tantalum compounds, dienes containing four carbon atoms such as butadiene and isoprene deserve special mention. Even a small amount of the compounds of the aforementioned component (b) produces an astonishing degree of activation. In general, it is not necessary to spread the addition of the activators of the component (b) over the whole duration of the reaction; in fact, it is in most cases sufficient to add these compounds at the start to initiate the reaction. The activation of the catalysts, for example tantulum compounds, with the aid of the compounds of the component (b) can be achieved by simply mixing the latter with the compounds of the component (a) which serve as solvent. Alternatively, the compounds of the component (b) may be admixed with the gas current containing the starting material, for example, acetylene, before it enters the actual reaction chamber, for example, with the aid of an injection device. Another method of activating the catalyst, for example the tantalum halide, consists in treating it with a relatively small proportion of a compound of the component (b) before distributing it in the solvent, for example in the compound of the component (a).

The following examples illustrate the invention.

EXAMPLE 1

An aluminum oxide boat containing 3.78 grams of niobium pentachloride is introduced in a reaction tube disposed in an electrically heated tubular furnace and a continuous stream of nitrogen is passed through the reaction tube. At the exit end of the reaction tube a cooled receptacle maintained at a temperature of about −50° C. is provided to accept the reaction product; the receptacle is followed by an empty washing bottle and this in turn by a washing bottle filled with N-sodium hydroxide solution.

At a temperature of 100° C. inside the tube about 3 liters of acetylene per hour are passed through which causes an exothermic reaction to take place with the temperature in the reaction tube rising to about 120° C. The yellow niobium pentachloride turns black and its volume increases substantially.

The benzene formed is frozen out in the cooled receptacle and the hydrochloric acid formed as by-product is absorbed in the washing bottle filled with sodium hydroxide solution.

The following table shows the results of several runs carried out at rising temperatures:

*Table 1*

| Temperature, in °C. | Test period, in minutes | Acetylene introduced, in grams | Pure benzene formed, in grams |
| --- | --- | --- | --- |
| 100 to 118 | 250 | 14.6 | 0.81 |
| 120 | 940 | 55 | 5.45 |
| 140 to 200 | 450 | 26.4 | 10.05 |

Even after a continuous operation lasting for about 25 hours, the catalyst has not lost its activity.

In the above test series there were further obtained as by-product in all about 20 millimols of hydrochloric acid. Accordingly, 4.3 grams of benzene per gram of niobium pentachloride and at least 1.4 mols of hydrochloric acid per mol of niobium pentachloride were formed. After having been purified by repeated distillation the benzene obtained revealed the following physical properties:

*Melting point.*—Found: 3–4° C.; theoretical: 5.5° C.
*Boiling point.*—Found: 78–80° C.; theoretical: 80.1° C.

and the following analytical values:

|  | Found, percent | Theoretical, percent |
| --- | --- | --- |
| Carbon | 91.08 | 92.2 |
| Hydrogen | 8.10 | 7.7 |

Benzene was also obtained when the above reaction was carried out with the use of about 2 grams of tantalum pentachloride instead of 3.78 grams of niobium pentachloride as catalyst.

EXAMPLE 2

(a) 450 cc. of anhydrous meta-xylene contained in a 4-necked flask of 1 liter capacity equipped with reflux condenser, are treated with 5.92 grams of niobium pentachloride while introducing nitrogen and kept in suspension by means of a vibration mixer. On contact with xylene the yellow niobium pentachloride turns orange-brown. The suspension is heated to 80° C. and acetylene is introduced through a tube dipping into the suspension, whereupon the mixture changes its color to bluish green and then to black. The amount of acetylene absorbed is measured by a flow meter each provided at the inlet and at the outlet of the apparatus.

The suspension absorbed 45 liters of acetylene at the rate of 200 to 290 cc. per minute, corresponding to an amount of 7.6 liters of acetylene per gram of niobium pentachloride.

At the temperature within the reactor it is possible—after having removed the reflux condenser and connected the reactor with a cooled receptacle—to distill the benzene continuously out of the suspension and to collect it in the receptacle. On completion of the reaction it is of advantage to remove any benzene left in the reaction vessel by continuing the introduction of the gas current containing acetylene, and collecting this product likewise in the receptacle.

When the benzene obtained as a condensate in the above test was purified, there were obtained about 10 grams of pure benzene which displayed the following physical properties:

*Melting point*: 3–4° C.
*Boiling point*: 78–80° C., $n_D^{20}=1.500$; theoretical: $n_D^{20}=1.500$.

(b) When the reaction described above was performed at a temperature of 10°, 50°, 100° and 130° C. respectively, benzene was likewise obtained and the yield was particularly good when the reaction was performed at 100° C.

(c) When the reaction described above was performed at 50° C. with the use of one of the following solvents (instead of meta-xylene): Carbon tetrachloride, methylene cyclohexane or the aliphatic hydrocarbon mixture "Shellsol T" [a petroleum solvent meeting Stoddard solvent specification and being a product of Shell Chem. Corp. registered trademark] (amount of acetylene absorbed: 7.1 liters per gram of niobium pentachloride), benzene was likewise formed. A particularly good yield was achieved when methylcyclohexane was used as solvent and after a run of about 3 hours' duration no deterioration of the activity of the catalyst suspension was observed.

EXAMPLE 3

(a) A mixture of 500 cc. of methylcyclohexane and 100 cc. of meta-xylene contained in a suitable 4-necked flask is treated with 10.3 grams of tantalum pentachloride and kept in suspension with the use of a vibration mixer. The orange-colored solution is heated for 10 minutes at 98° C., whereupon it turns green and finally black and a distinct absorption of acetylene can be observed. When the reaction has set in, the reaction mixture is cooled to 80° C. and acetylene is passed through at a rate of 400 cc. per minute, which amount is completely absorbed by the solution.

After a reaction period of 16½ hours the suspension continues to take up acetylene at an undiminished rate.

In all about 400 liters of acetylene were taken up and 310 grams of benzene purified by repeated distillation were obtained.

(b) 250 cc. of meta-xylene contained in a suitable 4-necked flask are treated with 2.97 grams of tantalum pentachloride and kept in suspension with the aid of a vibration mixer.

The reaction, which sets in after heating to 100° C., is interrupted when the suspension has taken up 30 liters of acetylene. There are obtained about 20 grams of benzene purified by rectification which displays the following physical properties.

Boiling point: 80° C.

Melting point: 2–4° C., $n_D^{20}$=1.500 (theoretical: 1.500).

During the reaction 2.23 mols of hydrogen chloride gas per mol tantalum pentachloride are evolved.

(c) 10 grams of tantalum pentachloride are suspended under nitrogen in 400 cc. of methylcyclohexane in a 4-necked flask of 1.5 liters capacity equipped with reflux condenser. Acetylene is then introduced into the flask instead of nitrogen, while heating the reaction mixture to 90° C. 100 cc. of meta-xylene are then added in one go, whereupon increasing absorption of acetylene in the suspension sets in. After 40 minutes the acetylene is being absorbed at a rate of 470 cc. per minute, and this rate is kept constant by suitably adjusting the rate at which acetylene is injected. During this operation the temperature within the flask is maintained for 6 hours at 75 to 89° C. and then lowered to 77 to 80° C. to prevent too violent refluxing of the benzene formed within the flask.

When 525 liters of acetylene have been absorbed, the reaction is discontinued and the considerably increased amount of substance in the flask is filtered off. About 20 grams of a black catalyst residue are isolated which is composed of 25.8% of tantalum, 19.65% of chlorine, 46.7% of carbon and 4.7% of hydrogen. On distillation the filtrate yields 799 grams of an enriched benzene which still contains 29.3% of methylcyclohexane (determined by gas-chromatography), that is to say that for 525 liters (=575 grams) of acetylene consumed there are obtained 565 grams of benzene, corresponding to a yield of over 95%.

(d) When the above reaction is carried out with the use of 500 cc. of "Shellsol T" (trademark of a mixture of aliphatic hydrocarbons produced by Shell Chem. Corp.) as solvent and at a temperature of 83° C., a similar result is obtained. The reaction may be caused to set in spontaneously at 80° C. by admixing with the current of acetylene entering the reaction chamber a small amount of isoprene, advantageously by injecting isoprene into the tube wall with the aid of an injection syringe. Thereupon, the suspension turns immediately yellow and then changes its color to black. When acetylene is introduced at a rate of 600 cc. per minute, it is completely absorbed by the solvent and converted substantially completely into benzene.

(e) 10 grams of tantalum pentachloride are suspended in 400 cc. of methylcyclohexane in the apparatus described above under (c). The suspension is heated to 60° C. and 3.3 grams of butadiene, together with acetylene as gaseous vehicle, are introduced. Immediately, an exothermic reaction sets in which persists beyond the point when the gas current introduced no longer contains butadiene. The temperature is maintained at 55° C. by cooling. When 84 liters of acetylene have been absorbed at a rate of 500 cc. per minute, the reaction is discontinued.

80 grams of pure benzene and 1 gram of an unidentified oil can be isolated from the receptacle.

(f) 10 grams of tantalum pentachloride are stirred under argon in a mixture of 300 cc. of "Shellsol T" (registered trade name) and 100 cc. of meta-xylene in a flask of 1 liter capacity equipped with a reflux condenser. The argon is then displaced by acetylene and the reaction mixture is heated to 73° C. In the course of 3 hours the rapidly setting in absorption of acetylene increases to 630 cc. per minute, and this rate is kept constant by suitably reducing the introduction of acetylene. The temperature is lowered to about 55° C. by cooling with ice water. After a reaction period of 6 hours the reflux condenser is removed because of the considerable increase in volume of the content of the flask and the reaction flask is connected with a condensation vessel. By raising the temperature to 65 to 70° C. and passing a weak current of argon it is possible to distil out of the flask an amount of benzene sufficient to maintain the desired liquid level in the flask. The suspension in the flask absorbs a total of 560 liters (=610 grams) of acetylene. Working up by way of filtration and distillation yielded 20.2 grams of a black catalyst residue (composition: 25.05% Ta; 17.85% Cl; 48.4% C; 4.0% H) and 600 grams of pure benzene, corresponding to a yield of over 95% of the theoretical.

(g) 6.7 grams of tantalum pentabromide were dispersed in 400 cc. of methylcyclohexane in the apparatus described above under (c). The suspension is heated to 80° C. while introducing nitrogen into the apparatus and 4 grams of isoprene are added, whereupon a yellow substance flocks out. Acetylene is then introduced at a rate of 500 liters per minute, whereupon in the course of the ensuing exothermic reaction it is completely absorbed by the solvent and converted substantially quantitatively into benzene.

(h) When tantalum pentabromide is suspended in a mixture of 400 cc. of the aliphatic hydrocarbon mixture marketed under the trade name "Shellsol T" and 100 cc. of meta-xylene, acetylene is likewise absorbed at 120° C. by the solution and converted into benzene.

(i) In the apparatus described under (c) above 10 grams of niobium pentachloride are stirred in 400 cc. of meta-xylene and the suspension is cooled to 0° C. When acetylene is then introduced, 450 cc. per minute thereof are immediately absorbed. The reaction mixture is then cooled to −20° C. and another 412 liters (=450 grams) of acetylene are injected. Conventional isolation on completion of the introduction of acetylene yields 326 grams of benzene, corresponding to 72% of the theoretical yield.

(k) 8.35 grams of tantalum pentachloride are suspended in 350 cc. of "Shellsol T" in a 4-necked flask of 1.5 liters capacity. The batch is then heated to 30° C. and acetylene is introduced. When 0.2 gram of niobium pentachloride is added through a lateral tubulure on the reaction flask, absorption sets in immediately and 155 liters of acetylene are converted within 125 minutes. Working up of the reaction product furnishes 125 grams of benzene and 27 grams of catalyst residue.

Instead of adding tantalum pentachloride and niobium pentachloride separately, there may be used crystals of tantalum pentachloride containing an adequate amount of niobium pentachloride as contaminant.

(l) 6.7 grams of tantalum pentabromide are suspended in 400 cc. of methylcyclohexane and the whole is heated under nitrogen to 80° C. When 4 cc. of isoprene are injected by means of a syringe and acetylene is then introduced, the latter is immediately absorbed by the suspension. In this manner 120 liters (=131 grams) of acetylene underwent conversion in the course of 4 hours.

The reaction is discontinued by adding acetone. Yield: 115 grams of benzene.

(m) 9.0 grams of niobium pentabromide are suspended in 400 cc. of meta-xylene in a 4-necked flask of 1.5 liters capacity, nitrogen is introduced, and the whole is heated to 80° C., whereupon the niobium pentabromide dissolves partially. Acetylene is then introduced and it is absorbed at a rate of 400 cc. per minute. After 3½ hours the reaction is discontinued. Yield: 48 grams of benzene.

EXAMPLE 4

(a) 8.5 grams of the yellow double salt of niobium pentachloride with potassium fluoride are suspended in a flask of 1.5 liters capacity in 400 cc. of anhydrous meta-xylene and while introducing acetylene the components of the mixture are finely dispersed with the aid of a vibration mixer; the mixture gradually turns reddish brown. When a temperature of 100° C. has been reached, a vigorous absorption of acetylene by the suspension sets in and reaches after 8 minutes a rate of about 400 cc. per minute; this rate is kept constant for 90 minutes by suitably calibrating the introduction of acetylene. The resulting black product contains in addition to niobium, potassium, chlorine and fluorine a small amount of a high polymer of acetylene. The main product is benzene; yield: 25 grams.

Analysis of the double salt used:

| | Percent |
|---|---|
| Nb | 28.4 |
| Cl | 53.9 |
| K | 11.4 |
| F | 5.6 |

(b) 7 grams of the double salt of niobium pentachloride with potassium chloride are suspended in 400 cc. of "Shellsol T" (registered trademark) in a flask of 1.5 liters' capacity.

At a temperature of 130° C. strong absorption of acetylene sets in and proceeds at a rate of about 250 cc. per minute. After 3 hours the reaction is discontinued, a black residue is filtered off and from the filtrate 15 grams of pure benzene are isolated.

(c) 10 grams of niobium oxychloride are suspended in a flask of 1.5 liters' capacity in 500 cc. of meta-xylene and the mixture is gradually heated while introducing acetylene. At 140° C. absorption of acetylene sets in at the rate of about 170 cc. per minute and is continued for 3 hours. After having filtered off a residue from the reaction mixture, 14 grams of benzene are obtained by distillation.

(d) In a flask of 1 liter capacity 7 grams of the adduct of niobium pentachloride and phosphorus oxychloride (a yellow crystalline powder) are suspended under nitrogen in 200 cc. of methylcyclohexane. At 35° C. the nitrogen is displaced by acetylene, whereupon a violent absorption accompanied by a rise in temperature sets in spontaneously. The temperature is then maintained by cooling at 50° C. and the absorption rate is kept constant at 400 cc. per minute. After 2½ hours the reaction is discontinued.

Filtration yields on one hand 10 grams of a brownish black precipitate and on the other hand a clear filtrate from which by fractionation 50 grams of benzene contaminated with a small amount of cyclohexane are isolated, which corresponds to a yield of about 77% of the theoretical.

(e) A mixture of 5 grams of the yellow adduct of nobium pentachloride with phosphorus pentachloride and 250 cc. of anhydrous meta-xylene is heated in a flask of 1.5 liters capacity while introducing acetylene. At 120° C. distinct absorption sets in which rapidly reaches a rate of 400 cc. per minute which is kept constant by suitably calibrating the supply of acetylene. After 2 hours the reaction is discontinued. Conventional working up yields 10 grams of a black residue. From its solution in meta-xylene there can be isolated 20 grams of benzene and 10 grams of unidentified products having a high boiling point.

(f) 8 grams of niobium pentachloride etherate (obtained by dissolving niobium pentachloride in hot ether and then precipitating the product by cooling the solution) are suspended in a flask of 1.5 liters capacity in 400 cc. of meta-xylene and the mixture is heated in the presence of acetylene. At 80° C. absorption sets in which is kept constant at a rate of 400 cc. per minute, with the initially reddish brown solution turning dark.

After 2 hours the reaction is discontinued. Conventional working up yields 14 grams of a black residue and 36 grams of pure benzene.

When the adduct of niobium pentachloride with tertiary butylamine or with di-n-octylmethylamine was used as catalyst, a similar result was achieved.

EXAMPLE 5

(a) 5.95 grams of niobium pentachloride are suspended in 500 cc. of anhydrous methylcyclohexane in a 4-necked flask of 1 liter capacity equipped with a reflux condenser, a vibro-mixer with mixing plate of stainless steel and a thermometer. At a temperature of 50° C. methylacetylene is introduced through an inlet tube dipping into the suspension with the aid of a weak current of nitrogen; the methylacetylene had been condensed in a flask preceding the reaction flask. During this operation the nitrogen escapes through the reflux condenser. Within a short time the catalyst suspension turns violet-brown and finally black, during which a considerable rise in temperature occurs. The reaction temperature is maintained at 62° C. by regulating the supply of methylacetylene and by external cooling. In the course of 150 minutes a total of 62 grams of methylacetylene is converted. The reaction mixture is then filtered and yields 3.4 grams of a grey catalyst residue. The yellow filtrate is extracted with sodium hydroxide solution and washed with distilled water until the washings run neutral. Fractionated distillation yields 31.5 grams of a fraction boiling between 161 and 165° C. which is identified as a mixture of the isomers mesitylene and pseudocumene.

| | C, percent | H, percent |
|---|---|---|
| Found | 89.64 | 10.07 |
| Calculated | 89.94 | 10.06 |

Molecular weight: 138 (theoretical: 120)
$n_D^{20}$ 1.5009:
Pseudocumene _____ 1.5048
Mesitylene _____ 1.4994

The infra-red spectrum confirms the analytical data. Using an adsorption band each characteristic of mesitylene (12 mμ) and of pseudocumene (12.45 mμ) and comparing the intensity of these bands with the intensity of the two pure products measured in coats of known thickness, the composition in percent was determined and found to be 33% of mesitylene and 67% of pseudocumene.

(b) 9 grams of niobium pentachloride are suspended in 400 cc. of methylcyclohexane in the apparatus described above under (a) and in the course of 90 minutes 103 grams of ethylacetylene are introduced, which undergo spontaneous reaction. The temperature is maintained at 64 to 65° C. When the reaction mixture is separated as described above under (a) there are obtained 8 grams of a black catalyst residue and 72 grams of a fraction boiling between 211 and 218° C. which latter consists of a mixture of 1:2:4-triethylbenzene and 1:3:5-triethylbenzene.

| | C, percent | H, percent | Boiling point, ° C. |
|---|---|---|---|
| Found | 88.90 | 11.05 | 210–218 |
| Theoretical | 88.82 | 11.18 | 218 |

To determine the respective proportions of the two isomers they are separated by way of gas-chromatography with the aid of an Apiezon-L column of 4 m. length and 12 mm. diameter at 150° C. The following measurement with the aid of an infra-red spectrograph revealed that the mixture of isomers had the following composition:

| | Percent by weight |
|---|---|
| 1:3:5-triethylbenzene | 26.6 |
| 1:2:4-triethylbenzene | 68.93 |
| Unidentified compounds | 4.45 |

(c) In the apparatus described above under (a) 25 grams of dimethyl acetylene are introduced at a temperature of about 70° C. into a suspension of 5.2 grams of niobium pentachloride in 200 cc. of cyclohexane. The reaction mixture was separated and purified and the methylcyclohexane solution was evaporated to yield 8 grams of hexamethylbenzene. Two recrystallizations from methanol+acetone yielded a product forming white flakes and having a sharp melting point of 161.5° C. (theoretical: 159–162° C.).

EXAMPLE 6

(a) 7.1 grams of niobium pentachloride are suspended under nitrogen is 500 cc. of absolute anhydrous methylcyclohexane in the apparatus described in Example 5 under (a) and heated to 65° C. A current of acetylene is introduced into this suspension at an average rate of 500 to 550 cc. per minute and in the course of 220 minutes 232 grams of ethylacetylene are admixed with said current of acetylene. As soon as the gas mixture enters the catalyst suspension, a brisk reaction sets in with the temperature rising rapidly to about 92° C.; this temperature is kept constant by cooling. In the course of the reaction 118.5 liters (=130.9 grams) of acetylene were absorbed by the catalyst suspension.

On completion of the reaction the catalyst residue was filtered off and the filtrate subjected to fractional distillation at 110° and then at 110 to 220° C. and the two fractions were subjected to gas-chromatographic analysis to reveal the following constituents:

| | Grams | Percent by weight |
|---|---|---|
| Benzene | 27.6 | 9.7 |
| Monoethylbenzene | 96.7 | 33.9 |
| Diethylbenzene | 116.4 | 40.8 |
| Triethylbenzene | 43.0 | 15.0 |
| Unidentified compounds | 1.7 | 0.6 |
| | 285.4 | |

(b) When in the reaction described above under (a) the mixture of ethylacetylene and acetylene is replaced by a mixture of methylacetylene and acetylene, all other conditions being identical and using a temperature of 70-90° C., a mixture of hydrocarbons of the following approximate composition results:

| | Percent by weight |
|---|---|
| Benzene | 1.6 |
| Toluene | 4.7 |
| Ortho-xylene | 6.3 |
| Meta-xylene and para-xylene | 20.6 |
| Mesitylene | 18.6 |
| Pseudocumene | 46.1 |
| Unidentified compounds | 2.1 |

EXAMPLE 7

In a 4-necked flask of 1 liter capacity equipped with a reflux condenser, a vibro-mixer with mixing plate of stainless steel and a thermometer, 8.4 grams of TaCl₅, containing 3.1% of NbCl₅, are suspended in 200 cc. of absolute benzene. After passing nitrogen through, the reaction mixture is indirectly cooled with ice-water, and acetylene is introduced for 14 minutes at a rate of about 500 cc. per minute. After the appearance of a blue-black coloration, the current of acetylene is throttled to 250 to 300 cc. per minute. 225 grams of benzene solution containing 22.5 grams of diacetylene are then added dropwise within about 60 minutes (molecular ratio acetylene: diacetylene=1.2:1). After the reaction is finished, the reaction mixture is filtered and the filtrate rendered alkaline with concentrated ammonia. Working up and distillation yield 33 grams of a viscous residue. 3 grams of the residue are separated chromatographically with carbon tetrachloride, benzene and ether or a mixture thereof.

Analysis (determination of the melting point, infrared spectrum) of the first fractions (1.25 grams) yields a preponderant quantity of diphenyl and little triphenyl. According to the infrared spectrum there is no naphthalene present.

The subsequent fraction (0.53 gram) consists of triphenyl, whilst the remainder (1.09 grams) is composed of higher polyphenyls. The infrared spectrum shows no anthracene.

EXAMPLE 8

The procedure is the same as in Example 7 but with the following quantities: 10.8 grams of TaCl₅, 1.15 grams of NbCl₅, 350 of benzene, 175 grams of benzene solution containing 17.5 grams of diacetylene. To begin with, 500 cc. of acetylene per minute are added during 20 minutes and during the 1 hour's addition of the diacetylene this quantity of acetylene is kept to (molecular proportion acetylene:diacetylene =3.6:1). The reaction mixture is worked up as described in the preceding example, 25 grams of a viscous product being obtained. 3 grams of this product are separated chromatographically and analytically examined, the first fraction consisting of 2.03 grams of diphenyl, the next fraction of 0.45 gram of triphenyl mixture and the remainder of 0.18 gram of higher polyphenyl.

What is claimed is:

1. A process for the manufacture of aromatic hydrocarbons by cyclizing acetylenically unsaturated hydrocarbons, containing as polymerizable unsaturated bonds at most two triple bonds and being selected from the group consisting of acetylene, diacetylene, dimethylacetylene, diethylacetylene, diphenylacetylene, methylacetylene, ethylacetylene and mixtures thereof, in which process said acetylenically unsaturated hydrocarbons are introduced, at a temperature, ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitarily acting catalyst consisting essentially of a halide of a heavy metal selected from the group consisting of tantalum pentachloride, tantalum pentabromide, niobium pentachloride, niobium pentabromide, niobium oxychloride, mixtures thereof, and adducts thereof with a nucleophilic compound selected from the group consisting of a phosphorus chloride, a phosphorus oxychloride, ammonia, a primary amine, a secondary amine, a tertiary amine, an alkali metal halide and an alkaline earth metal halide, the aromatic hydrocarbons produced are separated by distillation after filtering off the cyclization catalyst.

2. A process for the manufacture of aromatic hydrocarbons by cyclizing acetylenically unsaturated hydrocarbons containing as polymerizable unsaturated bonds at most two triple bonds and being selected from the group consisting of acetylene, diacetylene, dimethylacetylene, diethylacetylene, diphenylacetylene, methylacetylene, ethylacetylene and mixtures thereof, in which process said acetylenically unsaturated hydrocarbons are reacted, at a temperature ranging from −10° to 200° C. and under a pressure ranging from 100 to 2000 mm. Hg, in the gaseous state and with the aid of a cyclization catalyst, said catalyst being a unitarily acting catalyst consisting of a halide of a heavy metal selected from the group consisting of tantalum pentachloride, tantalum pentabromide, niobium pentachloride, niobium pentabromide, niobium oxychloride, mixtures thereof, and adducts thereof with a nucleophilic compound selected from the group consisting of a phosphorus chloride, a phosphorus oxychloride, ammonia, a primary amine, a secondary amine, a tertiary amine, an alkali metal halide and an alkaline earth metal halide, the aromatic hydrocarbons produced are separated and purified by distillation.

3. A process for the production of benzene by cyclizing acetylene, in which process acetylene is introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitarily acting catalyst consisting of a halide of a heavy metal selected from the group consisting of tantalum pentachloride, tantalum pentabromide, niobium pentachloride, niobium pentabromide, niobium oxychloride, mixtures thereof, and adducts thereof with a nucleophilic compound selected from the group consisting of a phosphorus chloride, a phosphorus oxychloride, ammonia, a primary amine, a secondary amine, a tertiary amine, an akali metal halide and an alkaline earth metal halide, the benzene produced is separated by distillation after filtering off the cyclization catalyst.

4. A process for the production of 1,2,4- and 1,3,5-trimethylbenzene by cyclizing methylacetylene, in which process methylacetylene is introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitarily acting catalyst consisting of a halide of a heavy metal selected from the group consisting of tantalum pentachloride, tantalum pentabromide, niobium pentachloride, niobium pentabromide, niobium oxychloride, mixtures thereof, and adducts thereof with a nucleophilic compound selected from the group consisting of a phosphorus chloride, a phosphorus oxychloride, ammonia, a primary amine, a secondary amine, a tertiary amine, an alkali metal halide and an alkaline earth metal halide, the trimethylbenzenes produced are separated by distillation after filtering off the cyclization catalyst.

5. A process for the production of 1,2,4- and 1,3,5-triethylbenzene by cyclizing ethylacetylene, in which process ethylacetylene is introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitarily acting catalyst consisting of a halide of a heavy metal selected from the group consisting of tantalum pentachloride, tantalum pentabromide, nobium pentachloride, niobium pentabromide, niobium oxychloride, mixtures therof, and adducts thereof with a nucleophilic compound selected from the group consisting of a phosphorus chloride, a phosphorus oxychloride, ammonia, a primary amine, a secondary amine, a tertiary amine, an alkali metal halide and an alkaline earth metal halide, the triethylbenzenes produced are separated by distillation after filtering off the cyclization catalyst.

6. A process for the production of polyphenyls by cyclizing a mixture of acetylene and diacetylene, in which process the mixture is introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitarily acting catalyst consisting of a halide of a heavy metal selected from the group consisting of tantalum pentachloride, tantalum pentabromide, niobium pentachloride, niobium pentabromide, niobium oxychloride, mixtures thereof, and adducts thereof with a nucleophilic compound selected from the group consisting of a phosphorus chloride, a phosphorus oxychloride, ammonia, a primary amine, a secondary amine, a tertiary amine, an alkali metal halide and an alkaline earth metal halide, the polyphenyls produced are separated by distillation after filtering off the cyclization catalyst.

7. A process for the manufacture of aromatic hydrocarbons by cyclizing acetylenically unsaturated hydrocarbons, containing as polymerizable unsaturated bonds at most two triple bonds and being selected from the group consisting of acetylene, diacetylene, dimethylacetylene, diphenylacetylene, methylacetylene, ethylacetylene and mixtures thereof, in which process said acetylenically unsaturated hydrocarbons are introduced, at a temperature ranging from −10° to 200° C. and under a pressure ranging from 100 to 2000 mm Hg, into an anhydrous organic solvent containing in suspension 2 to 40 grams of a cyclization catalyst per liter of solvent, said catalyst being a unitarily acting catalyst consisting essentially of a mixture of tantalum pentachloride and niobium pentachloride, the aromatic hydrocarbons produced are separated by distillation after filtering off the cyclization catalysts.

8. A process for the manufacture of aromatic hydrocarbons by cyclizing acetylenically unsaturated hydrocarbons, containing as polymerizable unsaturated bonds at most two triple bonds and being selected from the group consisting of acetylene, diacetylene, dimethylacetylene, diphenylacetylene, methylacetylene, ethylacetylene and mixtures thereof, in which process said acetylenically unsaturated hydrocarbons are reacted, at a temperature ranging from −10° to 200° C. and under a pressure ranging from 100 to 2000 mm. Hg, in the gaseous state and with the aid of a cyclization catalyst, said catalyst being a unitarily acting catalyst consisting essentially of a mixture of tantalum pentachloride and niobium pentachloride, the aromatic hydrocarbons produced are separated and purified by distillation.

9. A process for the manufacture of aromatic hydrocarbons by cyclizing acetylenically unsaturated hydrocarbons, containing as polymerizable unsaturated bonds at most two triple bonds and being selected from the group consisting of acetylene, diacetylene, dimethylacetylene, diethylacetylene, diphenylacetylene, methylacetylene, ethylacetylene and mixtures thereof, in which process said acetylenically unsaturated hydrocarbons are introduced in the presence of a small amount of a diene containing four carbon atoms, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitarily acting catalyst consisting essentially of a halide of a heavy metal selected from the group consisting of tantalum pentachloride, tantalum pentabromide, niobium pentachloride, niobium pentabromide, niobium oxychloride, mixtures thereof, and adducts thereof with a nucleophilic compound selected from the group consisting of a phosphorus chloride, a phosphorus oxychloride, ammonia, a primary amine, a secondary amine, a tertiary amine, an alkali metal halide and an alkaline earth metal halide, the aromatic hydrocarbons produced are separated by distillation after filtering off the cyclization catalyst.

References Cited by the Examiner
UNITED STATES PATENTS 2,990,434   6/61   Smith _____ 260—673

ALPHONSO D. SULLIVAN, *Primary Examiner.*